(12) United States Patent
Adenau

(10) Patent No.: US 11,009,179 B2
(45) Date of Patent: May 18, 2021

(54) LIGHTING CONTROL CONSOLE HAVING AN ADJUSTABLY MOUNTED SCREEN HOUSING

(71) Applicant: MA LIGHTING TECHNOLOGY GMBH, Waldbüttelbrunn (DE)

(72) Inventor: Michael Adenau, Würzburg (DE)

(73) Assignee: MA LIGHTING TECHNOLOGY GMBH, Waldbüttelbrunn (DE)

( * ) Notice: Subject to any disclaimer, the term of this patent is extended or adjusted under 35 U.S.C. 154(b) by 253 days.

(21) Appl. No.: 16/336,681

(22) PCT Filed: Sep. 25, 2017

(86) PCT No.: PCT/EP2017/074189
§ 371 (c)(1),
(2) Date: Mar. 26, 2019

(87) PCT Pub. No.: WO2018/060122
PCT Pub. Date: Apr. 5, 2018

(65) Prior Publication Data
US 2020/0378549 A1    Dec. 3, 2020

(30) Foreign Application Priority Data
Sep. 30, 2016  (DE) .................... 10 2016 118 597.3

(51) Int. Cl.
*F16M 11/10*     (2006.01)
*H05B 47/155*    (2020.01)
(Continued)

(52) U.S. Cl.
CPC .......... *F16M 11/10* (2013.01); *F21V 23/003* (2013.01); *F21V 33/0052* (2013.01);
(Continued)

(58) Field of Classification Search
None
See application file for complete search history.

(56) References Cited

U.S. PATENT DOCUMENTS 5,646,818 A    7/1997  Hahn
5,938,163 A *  8/1999  Gotham, Sr. ......... G06F 1/1601
                                                  248/371

(Continued)

FOREIGN PATENT DOCUMENTS

DE         9312455 U1    9/1994
DE    10 2007 058 166 B3    5/2009
(Continued)

OTHER PUBLICATIONS

China National Intellectual Property Administration, Search Report and First Office Action, Application No. 201780005151.8, dated Jul. 10, 2019, 7 pages.
(Continued)

*Primary Examiner* — Xanthia C Cunningham
(74) *Attorney, Agent, or Firm* — Quarles & Brady LLP

(57) ABSTRACT

The disclosure relates to a lighting control console (01) for controlling a lighting system, digital adjusting commands being generated in the lighting control console (01), which commands can be transmitted to the lighting devices of the lighting system via data links, and said lighting control console (01) comprising at least one digital processor and at least one digital memory for generating, managing and storing the adjusting commands, and said digital processor and said digital memory being arranged in a console housing (08), and a control panel (07) having at least one control element, in particular a key button (04) and/or at least one slide control (05) and/or at least one rotary control, being provided at the upper side of the console housing (08), which control panel allows users to enter control commands, and said lighting control console (01) comprising at least (Continued)

one screen (02), and said screen (02) being arranged in a screen housing (03), wherein said screen housing (03) is mounted, with the aid of a double pivot bearing (09), at the console housing (08) so as to be adjustable, wherein said double pivot bearing (09) is linked to the console housing (08), being rotationally adjustable about a first pivot axis (17), and wherein said double pivot bearing (09) is linked to the screen housing (03), being rotationally adjustable about a second pivot axis (16).

17 Claims, 8 Drawing Sheets

(51) Int. Cl.
| | | |
|---|---|---|
| *H05B 47/18* | (2020.01) | |
| *H05B 47/165* | (2020.01) | |
| *F21V 23/00* | (2015.01) | |
| *F21V 33/00* | (2006.01) | |
| *G06F 1/16* | (2006.01) | |
| *G06F 3/041* | (2006.01) | |

(52) U.S. Cl.
CPC .......... *G06F 1/1601* (2013.01); *G06F 1/1607* (2013.01); *G06F 1/1618* (2013.01); *G06F 1/1679* (2013.01); *G06F 1/1681* (2013.01); *G06F 1/1683* (2013.01); *H05B 47/155* (2020.01); *H05B 47/165* (2020.01); *H05B 47/18* (2020.01); *G06F 3/0412* (2013.01)

(56) References Cited

U.S. PATENT DOCUMENTS

| | | | |
|---|---|---|---|
| 9,229,480 B2* | 1/2016 | Tani | ................ G06F 1/1662 |
| 9,402,291 B1* | 7/2016 | Adenau | ............... H05B 47/155 |
| 2005/0128695 A1 | 6/2005 | Han | |
| 2006/0103333 A1* | 5/2006 | Toms | .................. H05B 47/155 |
| | | | 315/312 |
| 2009/0140667 A1 | 6/2009 | Adenau | |
| 2012/0206893 A1 | 8/2012 | Bohn et al. | |
| 2014/0118899 A1 | 5/2014 | Chi et al. | |
| 2016/0003428 A1* | 1/2016 | Anderson | ................ F21S 4/26 |
| | | | 362/147 |

FOREIGN PATENT DOCUMENTS

| | | |
|---|---|---|
| DE | 20 2013 102 890 U1 | 8/2013 |
| WO | 2014063250 A1 | 5/2014 |

OTHER PUBLICATIONS

PCT International Search Report, PCT/EP2017/074189, dated Feb. 2, 2018, 6 pages.

PCT English Language Translation of the International Preliminary Report on Patentability, PCT/EP2017/074189, dated Apr. 11, 2019, 8 pages.

* cited by examiner

LIGHTING CONTROL CONSOLE HAVING AN ADJUSTABLY MOUNTED SCREEN HOUSING

CROSS-REFERENCE TO RELATED APPLICATIONS

This application represents the national stage entry of PCT International Application No. PCT/EP2017/074189 filed on Sep. 30, 2017, which claims the benefit of German Patent Application No. 10 2016 118 597.34 filed on Sep. 30, 2016, and the entire contents of each of these priority applications are incorporated herein by reference for all purposes.

The disclosure relates to a lighting control console having a screen housing that is mounted at the console housing so as to be adjustable.

Generic lighting control consoles serve for controlling lighting systems such as those employed in theaters or on concert stages, for instance. Routinely, said lighting systems comprise a plurality of lighting devices, for instance stage spotlights, wherein, in the lighting devices on their own, it is in many cases also possible to switch between a plurality of lighting states, for instance between different colors. These different lighting states of the lighting devices that are in each case connected to the lighting control console can be controlled in the lighting program of the lighting control console by way of programmed parameters. Here, standard lighting systems may comprise up to several thousand lighting devices. In order to be able to control such complex lighting systems, the generic lighting control consoles are equipped with a digital processor, which permits digital data and signal processing. For storing the control data, a digital memory is routinely provided, which in particular allows for storing and accordingly archiving of lighting programs. For protecting the electrical and electronic components of the lighting control console, the corresponding components are installed in a console housing that shields the electrical and electronic components of the lighting control console to the outside.

For programming the lighting program or for controlling the lighting program while it is running, operators have to enter control commands as input values. Said control commands can, for instance, be the selection of a specific lighting device or the setting of a specific parameter. For entering these control commands, mechanical control elements, such as key buttons, rotary controls (encoders) or slide controls, are available at known lighting control consoles, said control elements being arranged at the upper side of the console housing in a control panel. Here, the control commands being assigned to the individual control elements may be altered by way of suitable menu changeovers in order to be able to program and control correspondingly complex lighting programs.

In the known lighting control consoles, at least one screen is additionally provided in order to allow operators to program or control the lighting control console or to facilitate said programming or controlling by displaying corresponding image contents. From U.S. Pat. No. 7,821,781 B2, for instance, a lighting control console having several screens is known. The screens of the lighting control console are installed in their own screen housing here. The screen housing is mounted, with the aid of an articulation, at the console housing so as to be pivotable and can be adjusted in relation to the console housing, pivoting about said articulation. In this lighting control console, users thus have the possibility to set a certain angle of view of the screens by pivoting the screen housing in relation to the console housing.

A disadvantage of the known lighting control console is, however, that the distance between the screens on the one hand and the operator on the other hand can only be adjusted to a very small degree and in a very limited adjusting range corresponding to the adjusting angle that has been set in each case.

It is therefore the object of the present disclosure to propose a lighting control console with which the screen housing with the incorporated screens can be adjusted with increased flexibility in relation to the console housing. It is in particular the object to open up the possibility to users to freely vary the distance between the control panel at the upper side of the console housing and the screens within the screen housing.

The lighting control console in accordance with the disclosure is based on the fundamental idea that the screen housing is mounted, with the aid of a double pivot bearing, at the console housing so as to be adjustable. Here, an important characteristic of said double pivot bearing is that the double pivot bearing is linked to the console housing, being rotationally adjustable about a first pivot axis. At the same time, the double pivot bearing is linked to the screen housing, being rotationally adjustable about a second pivot axis. As a result, it is thus achieved by way of the double pivot bearing that an additional degree of freedom, namely an additional pivot axis, is realized during the adjustment of the screen housing in relation to the console housing. Here, the screen housing itself is not directly linked to the console housing anymore. By pivoting the double pivot bearing, the screen housing or the console housing being pivoted about the two pivot axes in relation to the double pivot bearing during this process, users can, for one thing, set the angle of view onto the screens in the screen housing corresponding to their personal wishes. At the same time, the spatial assignment between the screen housing and the console housing may be altered in order to change, for instance, the distance between the control panel on the console housing and the screen within the screen housing.

This is a major advantage in particular when control elements, for instance key buttons, slide controls or rotary controls, are also provided on the front of the screen housing because users can then individually set the distance which they have to bridge with their hands for operating said control elements. The control element can also be a touch screen that serves as a screen for displaying output data at the same time.

There are different options for the configuration in terms of the design of the double pivot bearing for mounting the screen housing at the console housing. The double pivot bearing can be realized in a particularly simple fashion when using a right and a left pivot arm. Each of the two pivot arms, with the aid of a lower articulation, is fastened to the console housing, being rotationally adjustable, and, with the aid of an upper articulation, is fastened to the screen housing, being rotationally adjustable. As a result, each of the two pivot arms thus is linked to the console housing and to the screen housing so as to be pivotable. By pivoting the pivot arms in relation to the console housing and by pivoting the screen housing in relation to the pivot arms, the angle of view of users onto the screens within the screen housing can, for one thing, be set individually and, at the same time, the spatial assignment of the screen housing with the control elements that might be provided at the same can be set in relation to the control surface of the console housing.

If the double pivot bearing is realized using two pivot arms, it is particularly advantageous if the adjusting movements of the two pivot arms are synchronized so that the two pivot arms assume the same pivot angle in relation to the console housing and in relation to the screen housing respectively. This synchronization between the two pivot arms can be realized in a simple manner in that either the two lower articulations of the right pivot arm and of the left pivot arm and/or the two upper articulations of the right pivot arm and of the left pivot arm are linked to each other by means of a linkage axis. Here, the linkage axes extend either along the first pivot axis or along the second pivot axis. By way of the linkage axis, the pivot movement of one pivot arm is transmitted onto the other pivot arm in each case so that it is not possible anymore to adjust the two pivot arms in any other fashion than synchronously with respect to each other. This can be achieved in a particular simple fashion in that, for instance, the ends of the linkage axes in the area of the articulations are linked, for instance welded, to the ends of the pivot arms.

For the operation of the screens within the screen housing, it is required that the digital processor of the lighting control console generates image signals and transmits them to the screen control. In order to allow for this signal transmission, electronic signal lines between the console housing and the screen housing are required. In order to not obstruct the adjustment of the screen housing in relation to the console housing by the electronic signal lines, it is particularly advantageous if the signal line is fastened to one of the pivot arms, in this manner partaking in the adjusting movement without further ado.

Furthermore, it is particularly advantageous if the signal lines run along the pivot axes through the two articulations of the assigned pivot arm into the console housing and into the screen housing. Here, the torsion that acts on the signal line is routinely so slight that it can be compensated by the elasticity of the signal line without any problems, without special contacts, for instance sliding contacts, being required at the pivot axes.

In order to avoid damage to the double pivot bearing and in particular damage to the signal lines between the console housing and the screen housing due to too much pivoting of the two housings in relation to each other, it is particularly advantageous if at least one end stop is provided at the double pivot bearing. By way of the end stop or by arranging several end stops, the maximum pivot path of the adjusting movement of the screen housing in relation to the console housing can be limited to a value smaller than 360°. By way of this limitation, it is in particular precluded that the signal line between the screen housing and the console housing is switched off due to one of the two housings being overwound.

For employing the lighting control console, it is very important that the screen housing remains in a set position after the users have set this position and that in particular adjusting the screen housing solely under the influence of the gravitational force that acts on the screen housing is precluded. In order to realize the preservation of the adjusting angles that are set by the users between the screen housing and the console housing, in particular also under the influence of the gravitational force, it is therefore particularly advantageous if at least one torque brake, which counteracts the adjusting movements of the screen housing in relation to the console housing in a decelerating fashion, is provided at the double pivot bearing. Here, the braking torque of the torque brake can in particular be selected to eliminate the torques that act on the double pivot bearing due to the gravitational force of the screen housing by means of the braking effect, an inadvertent adjustment of the screen housing by the users being precluded thereby.

In which manner the torque brake is embodied at the double pivot bearing in terms of the design is in principle arbitrary. This function can be realized in a particularly simple fashion by way of a multiple disk brake. Here, the multiple disc brake, within a housing, includes several multi-disks that are arranged in a disk pack, the multi-disks alternately being linked to the multi-disk housing or to the assigned pivot axis in each case. Here, a corresponding frictional force acts between the individual multi-disks so that the pivoting of the pivot axis in relation to the housing of the multiple disk brake is decelerated as a function of the contact pressure between the individual multi-disks.

As an alternative to a multiple disk brake, the torque brake may also be embodied in the manner of a disk brake. Here, the brake discs of the disc brake are driven via a transmission gearing by adjusting the screen housing (03) in relation to the console housing in order to increase the relative speed of the brake disks compared to the fixed brake pad, thereby correspondingly improving the braking effect even in connection with slight adjusting movements.

In order to increase ease of operation for the users when adjusting the screen housing in relation to the console housing, at least one drive motor can be provided at the double pivot bearing in accordance with a preferred embodiment, said drive motor permitting the screen housing to be adjusted in relation to the console housing in a motor-driven fashion. The drive motor may, for instance, be engaged with the linkage axis between two pivot arms so that the two pivot arms are correspondingly pivoted due to the motor-driven adjustment of the linkage axis.

Due to the additional adjusting possibilities that result from the use of the double pivot bearing in accordance with the disclosure between the console housing and the screen housing, it is additionally possible to realize additional ranges of functions with the aid of the screen housing for protecting the lighting control console. Hereunto, the back of the screen housing is embodied in the manner of a lid, wherein the screen housing can be arranged in a closed position by way of adjusting the double pivot bearing, in which closed position the control panel of the console housing is covered towards the outside by the screen housing. If the screen housing is thus in the closed position, it serves as a lid at the same time, with the aid of which the control panel of the lighting control console is protected at the upper side of the console housing towards the outside. By pivoting the screen housing out of the closed position, the lighting control console can then be moved into its actual operating position in which the lighting system can be programmed or controlled.

If the screen housing additionally serves as a lid for the lighting control console, at least one fixing device should be provided at the lighting control console, said device making it possible to fix the screen housing in the closed position, in which the back serves as a lid. In this manner, the arrangement of the screen housing in the closed position can also be secured during the transport of the lighting control console at any time in order to reliably preclude that the screen housing is inadvertently adjusted out of the closed position during the transport of the lighting control console.

If the back of the screen housing also serves as a lid in the arrangement of the screen housing in its closed position, it is particularly advantageous if spacers are provided at the console housing and/or at the screen housing. By way of said spacers, a defined minimum distance between the front of the screen housing and the control panel of the console housing can be secured in order to preclude damage due to an undesired contact between the front of the screen housing and the control panel of the console housing.

The lighting control console in accordance with the disclosure with the additional adjusting possibilities of the double pivot bearing particularly offers major advantages if the screens in the screen housing are embodied in the manner of touch-sensitive touch screens. In this case, the touch screens do not only serve as a display device, but additionally as input elements which allow the operators to enter input commands. With this double function of the touch screens as display elements on the one hand and as input elements on the other hand, it is particularly important that the operators can also set an optimum spatial arrangement of the touch screens in relation to the control surface of the lighting control console apart from the optimum angle of view.

In the drawings, one embodiment of the disclosure is schematically illustrated and will be explained by way of example in the following.

Figure 1:
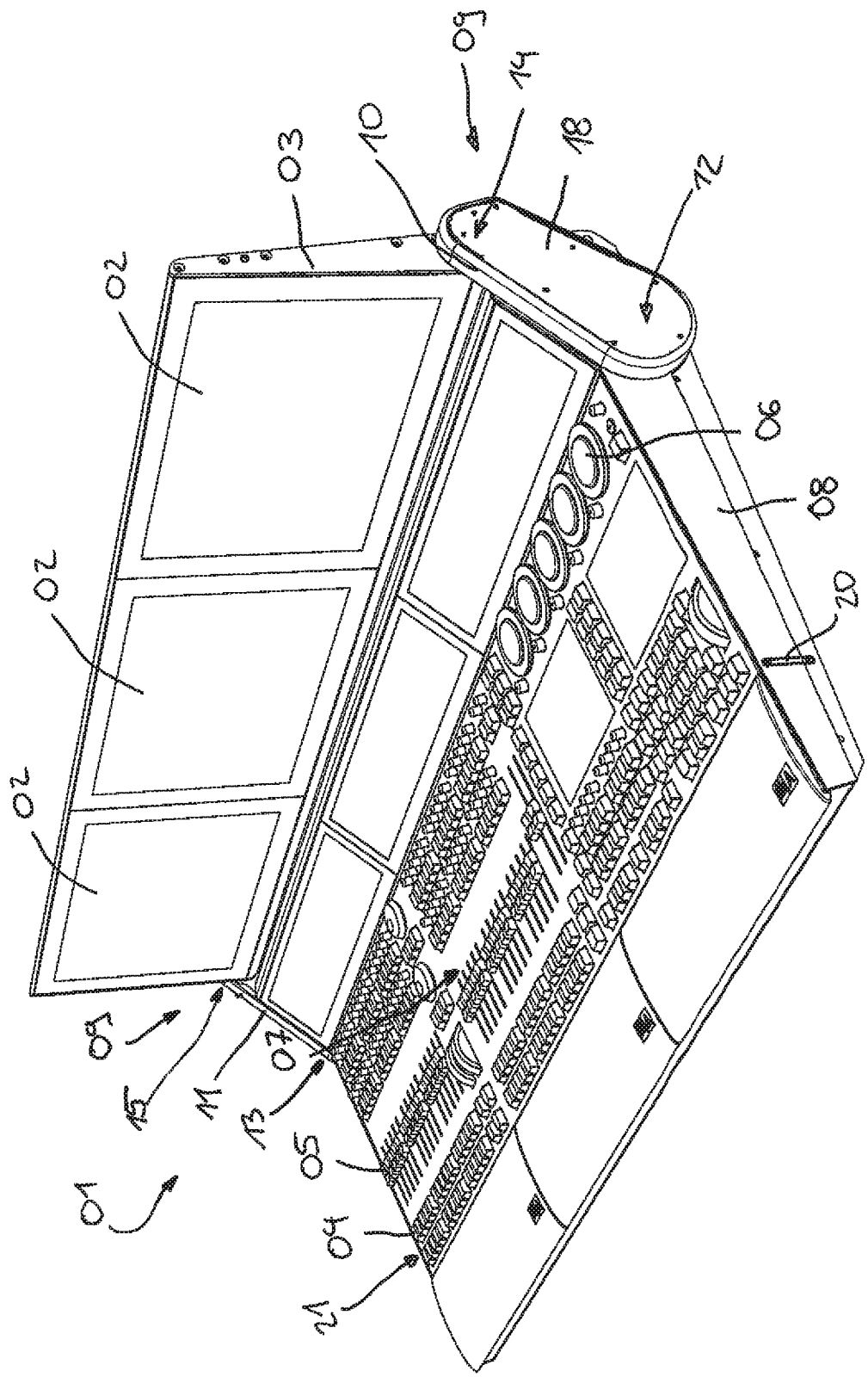
FIG. 1 shows a lighting control console having a double pivot bearing between the console housing and the screen housing.

FIG. 1 shows, in a perspective view, a lighting control console 01 in accordance with the disclosure for programming and controlling a lighting system. The lighting control console 01 is equipped with three screens 02 for displaying various menus for the users. The screens 02 are on their part installed in a screen housing 03.

For entering adjusting commands, a plurality of key buttons 04, slide controls 05 and rotary controls (encoders) 06 is provided at the lighting control console 01 in a control panel 07 at the upper side of a console housing 08. A double pivot bearing 09 serves for the adjustable mounting of the screen housing 03 at the console housing 08. Here, said double pivot bearing is structured, in terms of the design, by a right pivot arm 10 and a left pivot arm 11, said right pivot arm 10 and said left pivot arm 11 in each case being fastened to the console housing 08 or to the screen housing 03 by means of a lower articulation 12 or 13 and by means of an upper articulation 14 or 15. A cover 18 is in each case fastened to the outside of the pivot arms 10 and 11, said cover protecting the internal mechanism and the signal lines 23 that run within the inside of the pivot arms 10 and 11.

Figure 2:
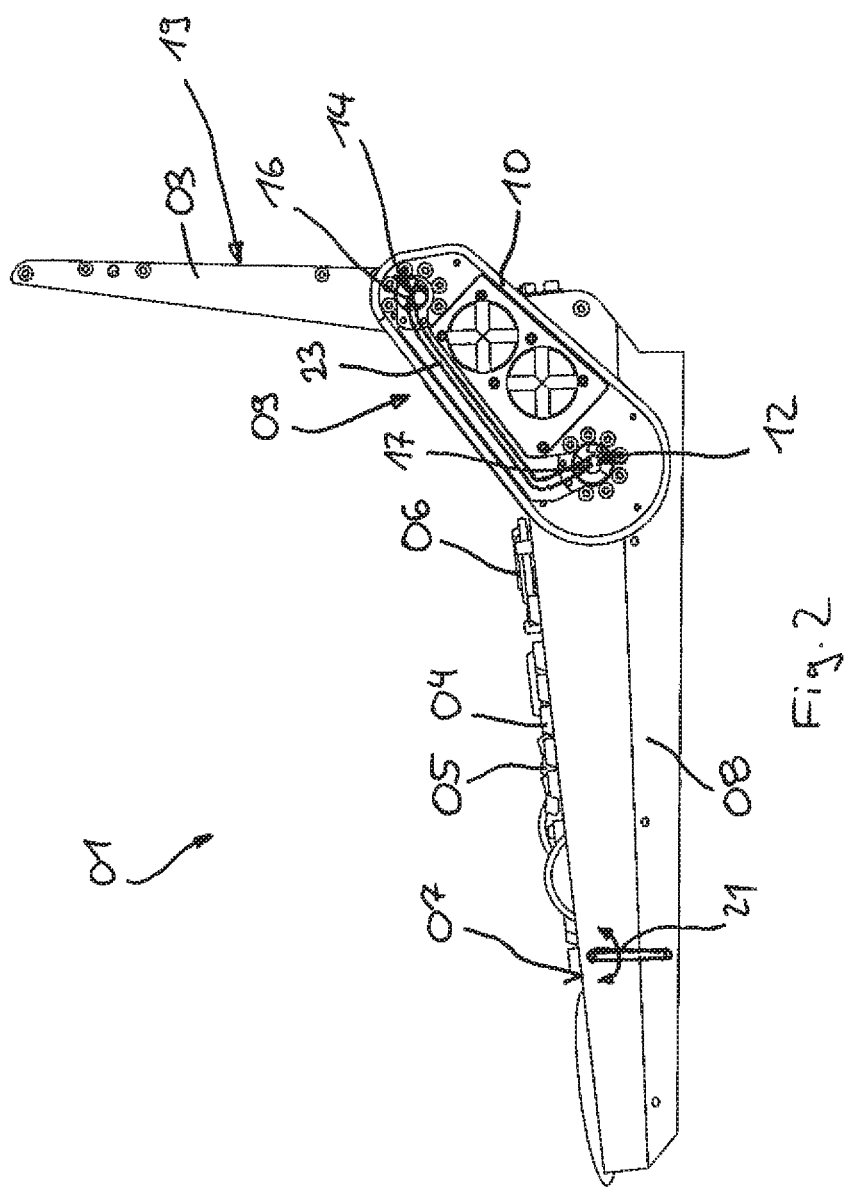
FIG. 2 shows the lighting control console in accordance with FIG. 1 when the screen housing is arranged in a first operating position, in a lateral view.

FIG. 2 shows the lighting control console 01 in a first operating position of the screen housing 03 in relation to the console housing 08. The cover 18, for a better understanding, is not illustrated in FIGS. 2 to 4. The screen housing 03 and the pivot arms 10 and 11 can rotationally be adjusted between the screen housing 03 and the console housing 08 in relation to the two pivot axes 16 and 17 by way of the double pivot bearing 09 in order to be able, for one thing, to individually set the angle of view of the users onto the screens 02 and, for another thing, to individually set the relative position of the touch-sensitive surface of the screens 02 in relation to the control panel 07.

Figure 3:
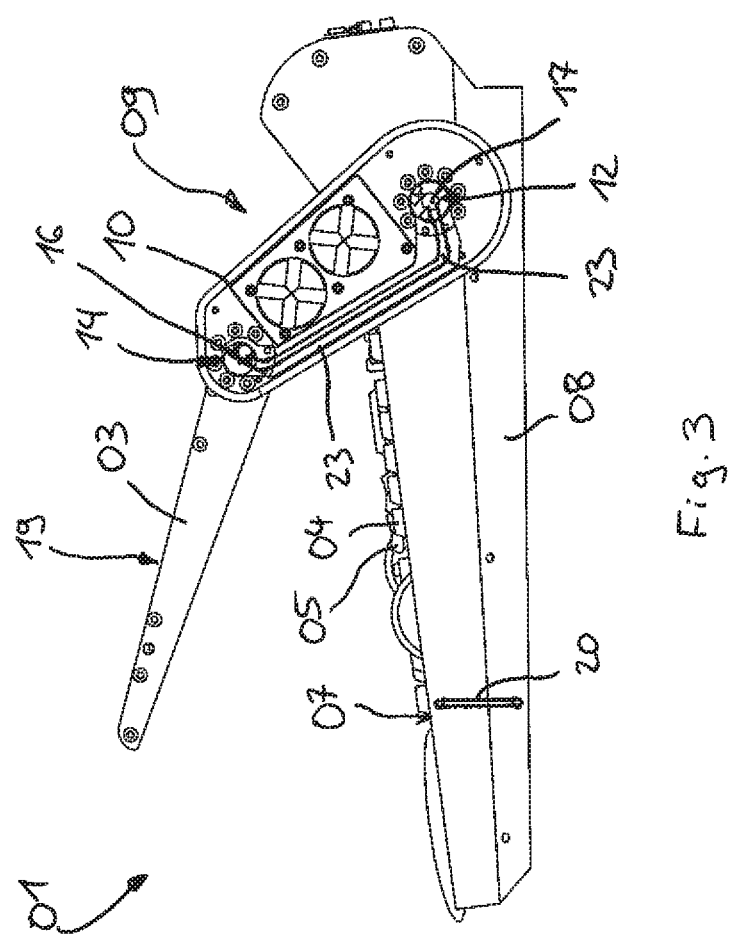
FIG. 3 shows the lighting control console in accordance with FIG. 2 when the screen housing is arranged in a second operating position, in a lateral view.

FIG. 3 shows the lighting control console 01 when the screen housing 03 is arranged, in relation to the console housing 08, in a second operating position. In this operating position, the screen housing 03 covers the control panel 07 from above almost completely so that the lighting control console 01 is used solely by entering control commands at the touch-sensitive screens 02.

Figure 4:
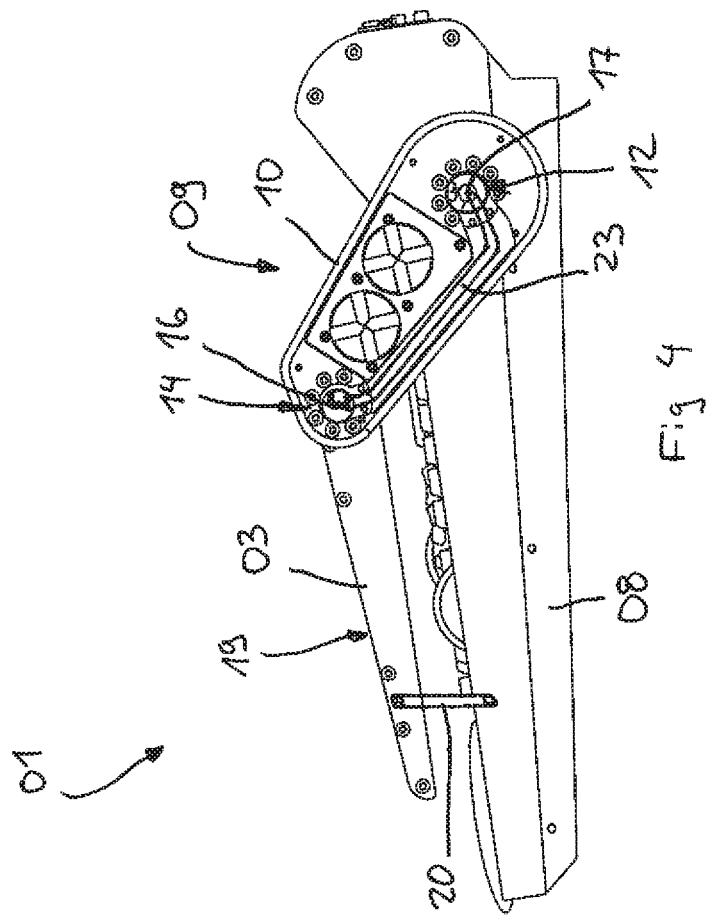
FIG. 4 shows the lighting control console in accordance with FIG. 2 when the screen housing is arranged in the closed position, in a lateral view.

FIG. 4 shows the lighting control console 01 when the screen housing 03 is arranged in the closed position. Hereunto, the back of the screen housing 03 is embodied in the manner of a lid 19 so that the screen housing 03, when being arranged in the closed position that is illustrated in FIG. 4, protects the various control elements of the lighting control console 01 against damage. By way of the fixing devices 20 and 21, the screen housing 03 can be fixed in the closed position that is illustrated in FIG. 4 so that the protection of the control elements of the lighting control console 01 is always guaranteed, also during the transport of the lighting control console 01. In the closed position, a minimum distance between the control panel 07 of the console housing 08 and the front of the screen housing 03 is secured by end stops in the double pivot bearing 09 in order to preclude contact and damage of the control elements 04, 05 and 06.

Figure 5:
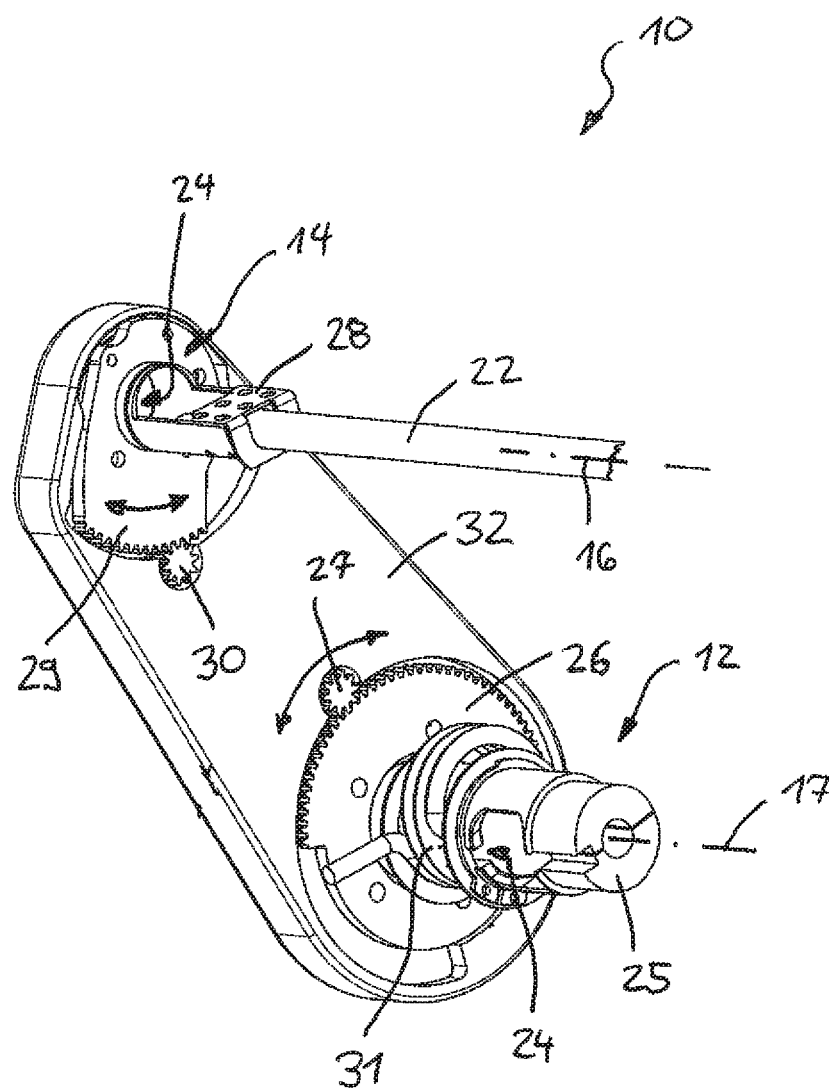
FIG. 5 shows the right pivot arm of the lighting control console in accordance with FIG. 1 in a perspective view from the inside.

FIG. 5 shows the right pivot arm 10 of the double pivot bearing 09 of the lighting control console 01 in a perspective view from the inside. The right upper articulation 14 and the left upper articulation 15, which is not illustrated in FIG. 5, are linked to each other in a rigid fashion by way of a linkage axis 22 so that the right upper articulation 14 and the left upper articulation 15 in each case assume exactly the same pivot angle. In this manner, a considerably increased stability is achieved when it comes to the mounting of the screen housing 03. In order to be able to lay the signal line 23 (see FIG. 2 to FIG. 4), which runs at the outside of the pivot arm 10, into the inside of the console housing 08 or into the inside of the screen housing 03, ducts 24 are in each case provided at the articulations 12, 13, 14 and 15, said ducts 24 allowing for a cable feedthrough of the signal line 23.

A bearing pin 25, which is fastened to the console housing 08, serves for forming the lower articulation 12, the pivot arm 10 being mounted so as to be pivotable on said bearing pin. A toothed wheel segment 26 is additionally fastened to the bearing pin 25 or to the console housing 08, said toothed wheel segment being linked to a drive pinion 27 of a disk brake. The function of the disk brake will be explained in the following in more detail on the basis of FIGS. 6 to 8.

A bearing pin 28 that is fixed in the screen housing 03 is in turn mounted in the pivot arm 10 in an articulated fashion, a toothed wheel segment 29 non-rotatably being fastened to the bearing pin 28 or to the screen housing 03. As a result, the pivot arm 10 thus realizes a double pivot bearing 09 in that the pivot arm 10, for one thing, can be pivoted on the bearing pin 25 about the lower pivot axis 17 and, for another thing, the bearing pin 28 can be pivoted about the upper pivot axis 16 in relation to the pivot arm 10.

The toothed wheel segment 29 is engaged with a drive pinion 30, which also drives a disk brake, as it will be explained in more detail in the following.

A weight compensation spring 31 is additionally provided at the bearing pin 25, said spring at least partially compensating for the torque which is brought about by the dead load of the screen housing, and which acts on the pivot arm 10 and could bring about an undesired spontaneous adjustment. In the neutral position of the pivot arm 10, the weight compensation spring 31 does not procure a compensating torque. If the pivot arm 10 is then deflected further, a torque thereby being brought about by the dead load of the screen housing, this is compensated for by the increasing pretensioning of the weight compensation spring 31, which is also brought about by the pivot arm 10 being pivoted.

Figure 6:
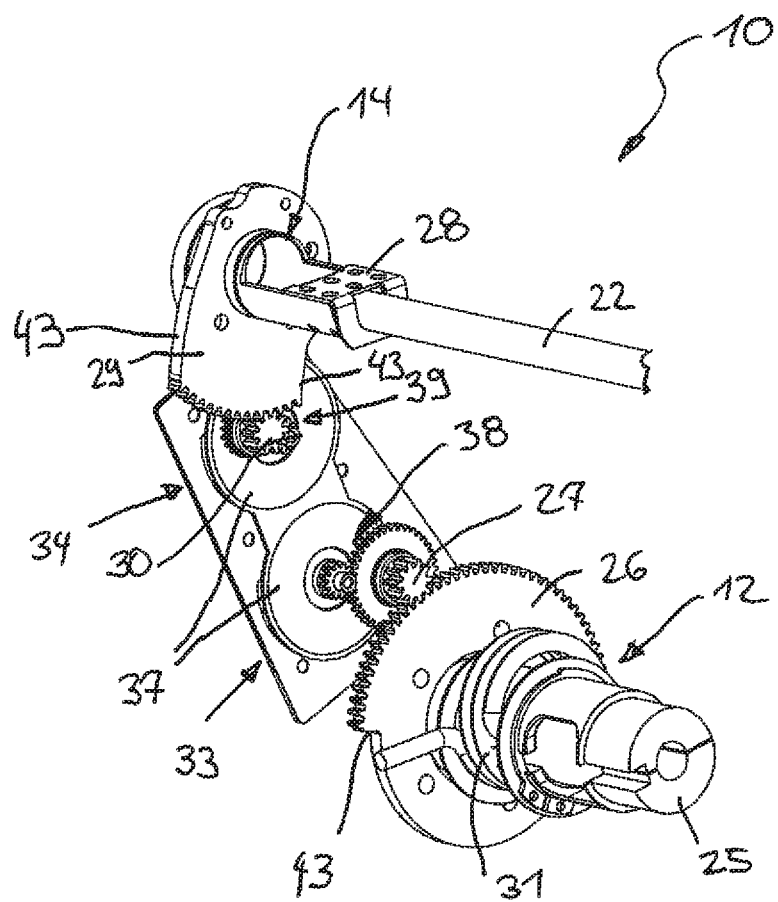
FIG. 6 shows the pivot arm in accordance with FIG. 5 after the pivot arm housing has been removed, in a perspective view from the inside.
Figure 7:
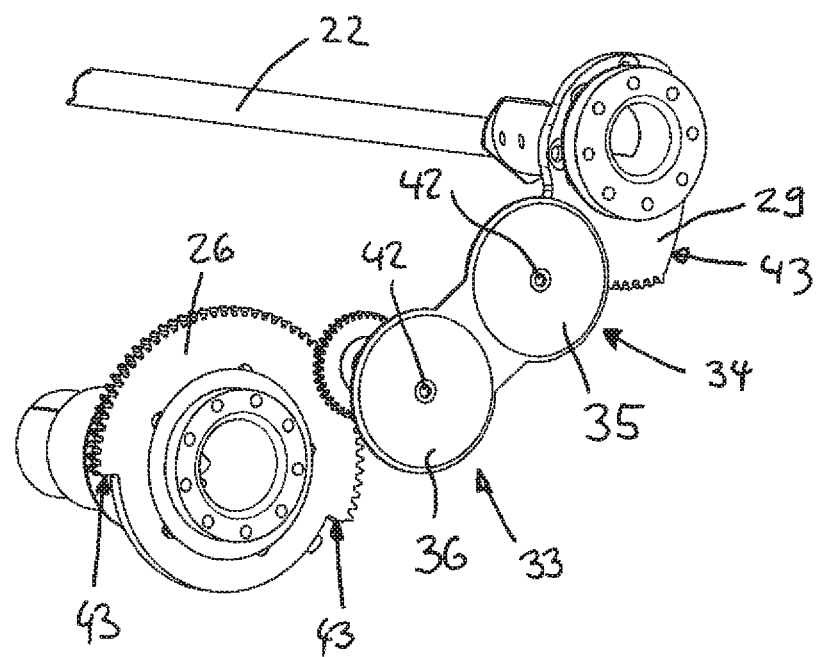
FIG. 7 shows the pivot arm in accordance with FIG. 6 in a perspective view from the outside.

FIG. 6 shows the pivot arm 10 after the housing 32 has been removed. The two disk brakes 33 and 34 can be seen, which are incorporated in the inside of the pivot arm 10. The drive pinions 27 and 30 in each case drive brake disks 35 or 36 (see FIG. 7) when the pivot arm 10 is being adjusted about the pivot axes 16 or 17, said brake disks abutting with their inner side upon a brake pad 37 that is mounted in a fixed fashion. Here, the speed of rotation of the brake disks 35 and 36 is increased by way of a multi-stage transmission gearing 38 or 39.

Figure 8:
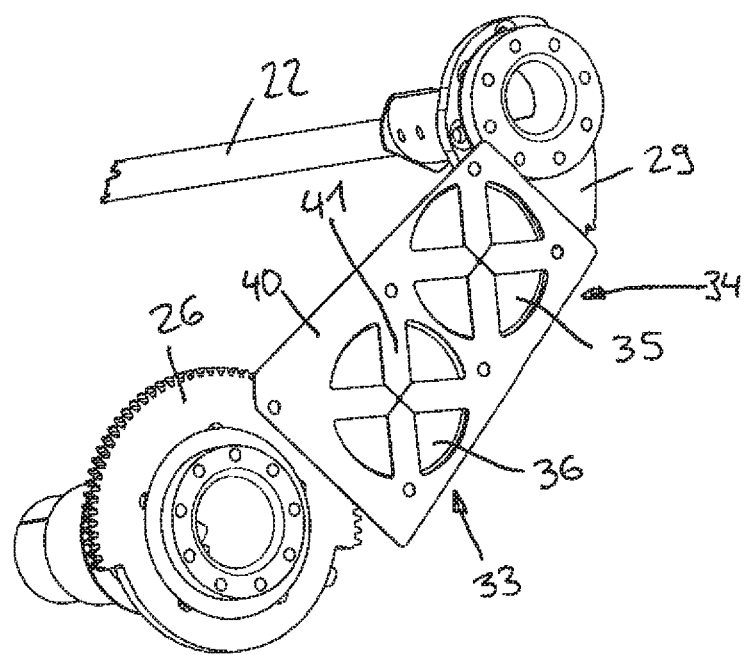
FIG. 8 shows the pivot arm in accordance with FIG. 7 after the spring tension plate has been attached, in a perspective view from the outside.

FIG. 8 shows a spring tension plate 40 that is fastened on the outside of the brake disks 35 and 36. The spring tension plate 40 comprises four spring arms 41 that are each articulated elastically for the two brake disks 35 and 36. The spring arms 41 press a ball that is received in the center of a ball reception 42 (see FIG. 7) so that a sufficient contact pressure between the brake disks 35 or 36 and the brake pad 37 is procured by way of the pretensioning of the spring arms 41.

End stops 43 are in each case provided at the toothed wheel segments 26 or 29, which end stops can abut upon corresponding abutment surfaces within the housing 32 of the pivot arm 10, thereby limiting the adjusting movement of the pivot arm 10 in relation to the console housing 09 or of the screen housing 03 in relation to the pivot arm 10.

The invention claimed is:

1. A lighting control console for controlling a lighting system, digital adjusting commands being generated in the lighting control console, which commands can be transmitted to the lighting devices of the lighting system via data links, and said lighting control console comprising at least one digital processor and at least one digital memory for generating, managing and storing the adjusting commands, and said digital processor and said digital memory being arranged in a console housing, and a control panel having at least one control element, in particular a key button and/or at least one slide control and/or at least one rotary control, being provided at the upper side of the console housing, which control panel allows users to enter control commands, and said lighting control console comprising at least one screen, and said screen being arranged in a screen housing, wherein
the screen housing is mounted, with the aid of a double pivot bearing, at the console housing so as to be adjustable, wherein said double pivot bearing is linked to the console housing, being rotationally adjustable about a first pivot axis, and wherein said double pivot bearing is linked to the screen housing, being rotationally adjustable about a second pivot axis.

2. The lighting control console according to claim 1, wherein
at least one control element which allows users to enter control commands is arranged at the front of the screen housing.

3. The lighting control console according to claim 1, wherein
the double pivot bearing comprises a right pivot arm and a left pivot arm, wherein the right pivot arm, with the aid of a lower articulation, is fastened to the right side of the console housing, being rotationally adjustable about the first pivot axis, and wherein the right pivot arm, with the aid of an upper articulation, is fastened to the right side of the screen housing, being rotationally adjustable about the second pivot axis, and wherein the left pivot arm, with the aid of a lower articulation, is fastened to the left side of the console housing, being rotationally adjustable about the first pivot axis, and wherein the left pivot arm, with the aid of an upper articulation, is fastened to the left side of the screen housing, being rotationally adjustable about the second pivot axis.

4. The lighting control console according to claim 3, wherein
the upper articulation of the right pivot arm and the upper articulation of the left pivot arm are non-rotatably linked to each other by means of a linkage axis which extends along the second pivot axis through the screen housing.

5. The lighting control console according to claim 1, wherein
the console housing and the screen housing are linked to each other by way of an electronic signal line, wherein the signal line is laid at or in one of the pivot arms.

6. The lighting control console according to claim 5, wherein
the signal line runs along the pivot axes in ducts through the two articulations of the assigned pivot arm into the console housing and into the screen housing.

7. The lighting control console according to claim 1, wherein
at least one end stop which limits the maximum pivot angle of the adjusting movement of the screen housing in relation to the console housing to a value smaller than 360° is provided at the double pivot bearing.

8. The lighting control console according to claim 1, wherein
at least one weight compensation spring is provided at the double pivot bearing, said spring at least partially compensating the torque brought about by the dead load of the screen housing.

9. The lighting control console according to claim 1, wherein
at least one torque brake, which counteracts the adjusting movements of the screen housing in relation to the console housing in a decelerating fashion, is provided at the double pivot bearing.

10. The lighting control console according to claim 9, wherein
the torque brake is embodied in the manner of a multiple disc brake.

11. The lighting control console according to claim 9, wherein
the torque brake is embodied in the manner of a disc brake.

12. The lighting control console according to claim 11, wherein the brake discs of the disc brake are driven via a transmission gearing by adjusting the screen housing and/or by adjusting the pivot arms in relation to the console housing.

13. The lighting control console according to claim 1, wherein at least one drive motor is provided at the double pivot bearing, said drive motor permitting the screen housing to be adjusted in relation to the console housing in a motor-driven fashion.

14. The lighting control console according to claim 1, wherein the back of the screen housing is embodied in the manner of a lid, wherein the screen housing can be arranged in a closed position in which the control panel of the console housing is covered towards the outside.

15. The lighting control console according to claim 14, wherein at least one fixing device is provided at the lighting control console, said device making it possible to fix the screen housing in the closed position.

16. The lighting control console according to claim 14, wherein spacers are provided at the console housing and/or at the screen housing, said spacers keeping the screen housing, in the closed position, at a defined distance above the control panel of the console housing.

17. The lighting control console according to claim 1, wherein the screen in the screen housing is embodied in the manner of a touch-sensitive touch screen.

\* \* \* \* \*